United States Patent [19]

Gill

[11] Patent Number: 4,685,093
[45] Date of Patent: Aug. 4, 1987

[54] SPEED MEASUREMENT DEVICE

[75] Inventor: Michael J. Gill, Milford-on-Sea, England

[73] Assignee: Brookes & Gatehouse Limited, England

[21] Appl. No.: 719,475

[22] Filed: Apr. 3, 1985

[51] Int. Cl.[4] .............................................. G01F 1/66
[52] U.S. Cl. ........................................ 367/89; 73/181; 73/861.28
[58] Field of Search ...................... 367/89, 91; 73/181, 73/861.27, 861.28, 861.29

[56] References Cited

U.S. PATENT DOCUMENTS

| 3,329,017 | 7/1967 | Yamamoto et al. | 73/861.28 |
| 3,751,979 | 8/1973 | Ims | 73/181 |
| 3,869,915 | 3/1975 | Baumoel | 367/91 X |
| 3,898,873 | 8/1975 | Stallworth et al. | 367/91 X |
| 3,949,605 | 4/1976 | Stallworth et al. | |
| 4,417,481 | 11/1983 | Krause | 73/861.28 |

FOREIGN PATENT DOCUMENTS

| 1285175 | 8/1972 | United Kingdom . |
| 1327651 | 8/1973 | United Kingdom . |
| 1422791 | 1/1976 | United Kingdom . |
| 1508636 | 4/1978 | United Kingdom . |
| 1542069 | 3/1979 | United Kingdom . |

OTHER PUBLICATIONS

Brown, "Dual Path Ultrasonic Measurement of Fluid Flow", *The Review of Scientific Instruments*, vol. 37, No. 9, Sep. 1966.

*Primary Examiner*—Richard A. Farley
*Attorney, Agent, or Firm*—Darby & Darby

[57] ABSTRACT

A speed measurement device for measuring the speed of a ship through the water is disclosed. The device comprises a transmitter circuit and a receiver circuit connected to two transducers $T_1$, $T_2$ which are based substantially in the direction of travel of a ship below the water line thereof. Pulse trains are transmitted in both directions between the transducers $T_1$, $T_2$ which are received by the receiver circuitry so that a signal is derived indicative of the time taken for the signals to travel both for and against the direction of travel of the ship, this signal being proportional to ship's speed. The device is designed to operate at a frequency of pulse transmission of 500 kHz and the receiver circuitry includes a variable threshold comparator 240, 250 and a divider circuit 260 for identifying a predetermined pulse in the developed part of the pulse train as received which allows accurate detection of the arrival time of the received pulse train at this frequency so that the transit time of the pulse train between the transducers $T_1$, $T_2$, and thus the speed of the ship can be accurately calculated.

11 Claims, 6 Drawing Figures

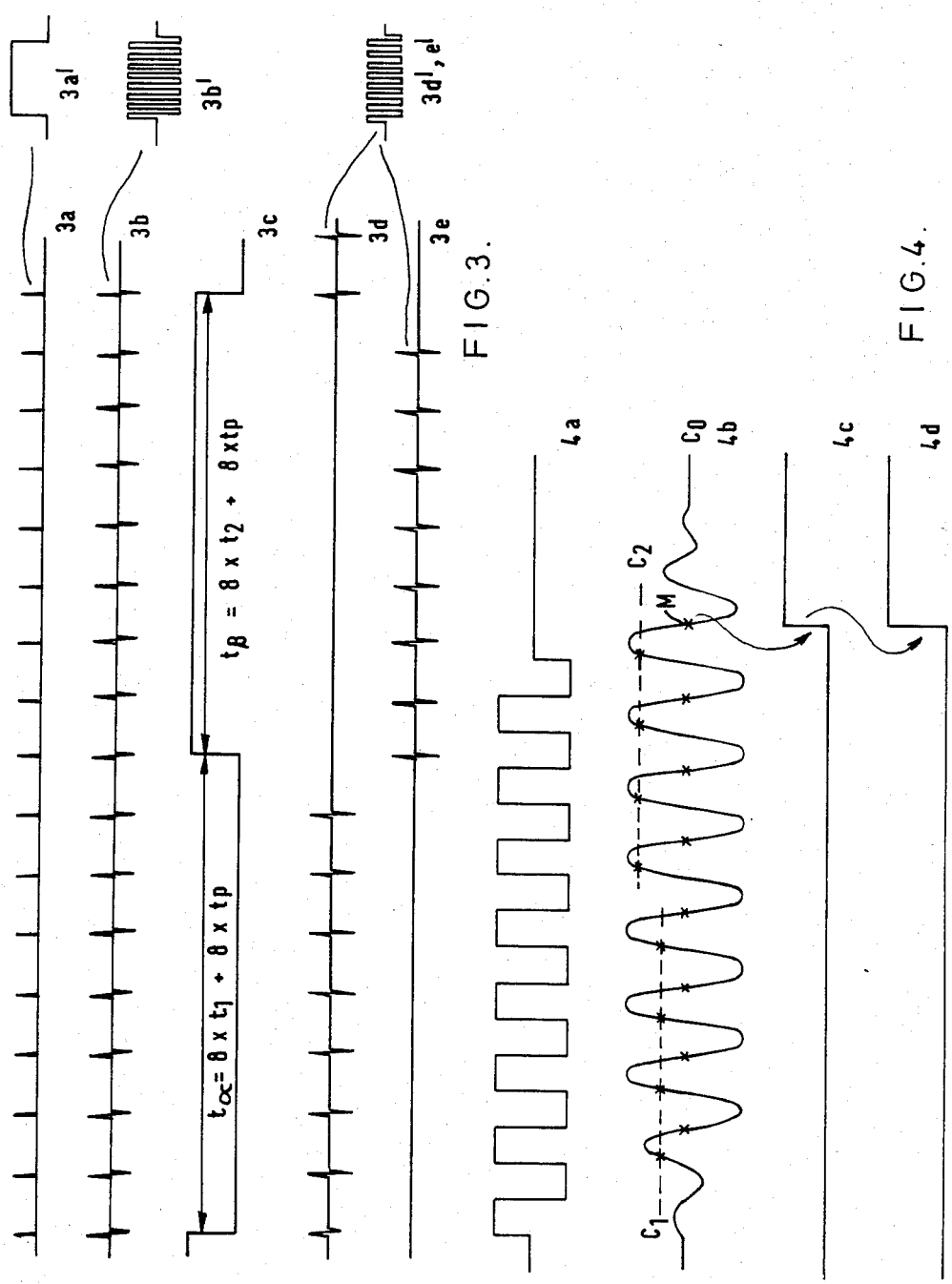

SPEED MEASUREMENT DEVICE

FIELD OF THE INVENTION

This invention relates to a speed measurement device particularly but not exclusively for measuring the speed of a ship through the water.

BACKGROUND OF THE INVENTION

A ship speed indicator has been proposed in U.S. Pat. No. 3,898,878 (Stallwood and Hartley) for measuring ship's speed by calculating the time taken for acoustic signals to travel between two projector-receiver modules, each containing a transmitter and a receiver, positioned at preselected points on the external bottom surface of the ships hull. A logic and display module located in the interior of the ship is connected between the projector-receiver modules. Measurements are made of the time taken by acoustic signals to travel from the projector of one of the modules to the receiver of the other and vice versa. From the distance between the selected points and the difference in time taken for the acoustic signals to travel in the opposed directions between the modules, the speed of the ship is derived.

For this system, the frequency of the acoustic signal projected into the water is 100 kilohertz. This frequency of propogation allows signal analysis to be conveniently performed. However, this choice of frequency has several disadvantages. Firstly, the frequency is used by conventional sonar devices and echo sounders. It also has a tendency to propogate large distances. The signals received by the respective modules are therefore prone to interference. Furthermore, in order to gain the required resolution at this frequency, a large distance required between the modules (approx. 10 meters) and, hence, the system is unsuitable for use with small ships or boats.

SUMMARY OF THE INVENTION

It is an object of the invention to provide an improved speed measurement device for use on small vessels.

It is a further object of the invention to provide an improved ship speed measurement device which is not susceptible to interference from sonar and echo sounding devices.

It is another object of the invention to provide a circuit for accurately measuring the transit times of acoustic signals.

It is a further object of the invention to provide receiver circuitry for a ship speed measurement device which takes a constant processing time for identifying signals transmitted from a first transmitter receiver to a second transmitter/receiver and vice versa.

According to the invention there is provided a speed measuring device, for measuring the speed of a marine vehicle, comprising:

first transducer means,
second transducer means,
the first and second transducer means being mountable on the marine vehicle below the waterline thereof, so as to face one another across an acoustic path substantially in the direction of motion of the vehicle.

transmitter means connected to said first and second transducer means for selecting one of the first and second transducer means and for supplying a pulse train to the selected transducer means for transmission along the acoustic path and further including means for changing the selected transducer means so as to change the direction of said transmission.

receiver means connected to said first and second transducer means for processing the pulse train received at the non-selected transducer means, the receiver means including means for identifying a predetermined pulse of said pulse train, counting means connected to the identifying means for counting a number of pulses after said predetermined pulse so as to identify a further pulse in the pulse train and outputting an arrival signal in response to identification of the further pulse.

control means connected to the transmitter means for enabling the transmitter means; and processing means connected and responsive to the transmitter means and receiver means for processing the transit times of the pulse train in both directions between the first and second transducer means for deriving a signal indicative of the speed of the vessel.

An embodiment of the invention will now be described, by way of example, with reference to the accompanying drawings, in which:

BRIEF DESCRIPTION OF THE DRAWINGS

FIGS. 3, 4 and 5 are timing diagrams showing signal characteristics at various points on the circuit of FIG. 2.

DESCRIPTION OF THE PREFERRED EMBODIMENT

The mode of operation of the described embodiment relies on a precise measurement of the transit times of high frequency acoustic pulses between two transmitters spaced substantially in the direction of travel of a boat or ship.

Figure 1:
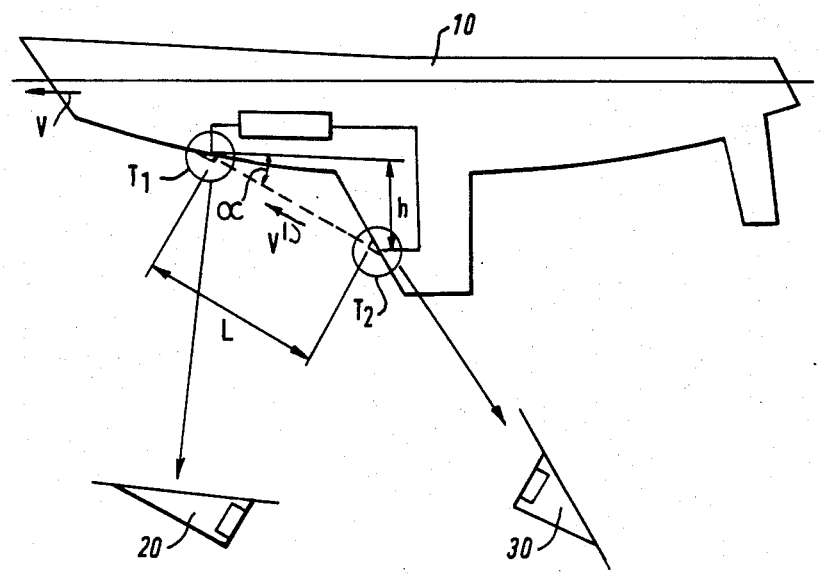
FIG. 1 is a schematic view of the hull of a ship to which an embodiment of the invention is applied.

With reference to FIG. 1, transducers $T_1$, $T_2$ which act both as transmitters and receivers are shown, mounted on the hull of a ship 10 in mountings 20, 30 which are shaped and positioned so that the transducers are spaced from one another across an acoustically quiet transmission path of length L, for example between the forefoot of the hull and the leading edge of the keel.

If the angle of inclination of the transmission path, with reference to the direction of movement of the boat is $\alpha$, the transmission times $t_1$, $t_2$ for pulses between the transducers $T_1$, $T_2$ are:

$$t_1 = L/(c+v') \qquad (1)$$

for pulses travelling in the same direction as the ship $$t_2 = L/(c-v') \qquad (2)$$

for pulses travelling in the opposed direction to the ship.
Where
c = the speed of sound through the water
$v' = v \cos \alpha$;
$\alpha = \sin^{-1} h/L$,
v = ship speed
Hence $t_1 - t_2 \approx 2Lv'/c^2$ ($c \gg v'$) $\qquad (3)$.
hence $$v' \simeq \frac{(t_1 - t_2)c^2}{2L}. \qquad (4)$$

Thus, provided the transit times $t_1$, $t_2$ can be measured accurately by timing the arrival of pulses transmitted from one transducer to the other (and vice versa), the speed of the ship, v, can be calculated.

A frequency of acoustic transmission between the transducers of 500 kilohertz is preferred. This frequency has several advantages. In particular scattering and reverberation caused by small bubbles at the sea surface is negligible except in areas of heavy aeration. Use of this frequency also allows small transducers (piezo-electric crystals of 10 mm diameter by 3 mm thick for example) to be used, and is high enough to enable the time measurements to be made with acceptable precision for acoustic path lengths L between the transducers $T_1$, $T_2$ of the order of 1 meter (a preferable range being 0.8–1.4 m), to allow use on small ships. This frequency also has limited propogation in sea water and it is not used for sonar and echo sounding uses which thus reduces possible interference.

However, use of such a high frequency means that conventional techniques for detecting the precise arrival of the transmitted pulse train are not suitable. At a frequency of 500 kHz, assuming that the system is required to resolve speed to one hundreth of a knot (approximately 5 mms per second), as the speed of sound in water is about 1500 meters per second, a time measurement precision of three parts per million is implied. This requires, for a acoustic path length of the order of a meter, time resolution of the order of nanoseconds.

A transmitting and receiving circuit for measuring the transit times $t_1$, $t_2$ will now be described with reference to FIG. 2.

The circuit is generally divided into transmitter and receiver sections controlled through a master flip flop 100.

The master flip flop 100 enables the transmitting circuit when active. The output of the flip flop 100 is connected, firstly, to a gated 1 MHz oscillator 110, which is in turn connected to a transmitter control circuit 130 via a divider circuit 120. The output from divider 120 is fed back through a divider circuit 140 which is connected to the ENABLE input of the flip flop 100.

Figure 6:
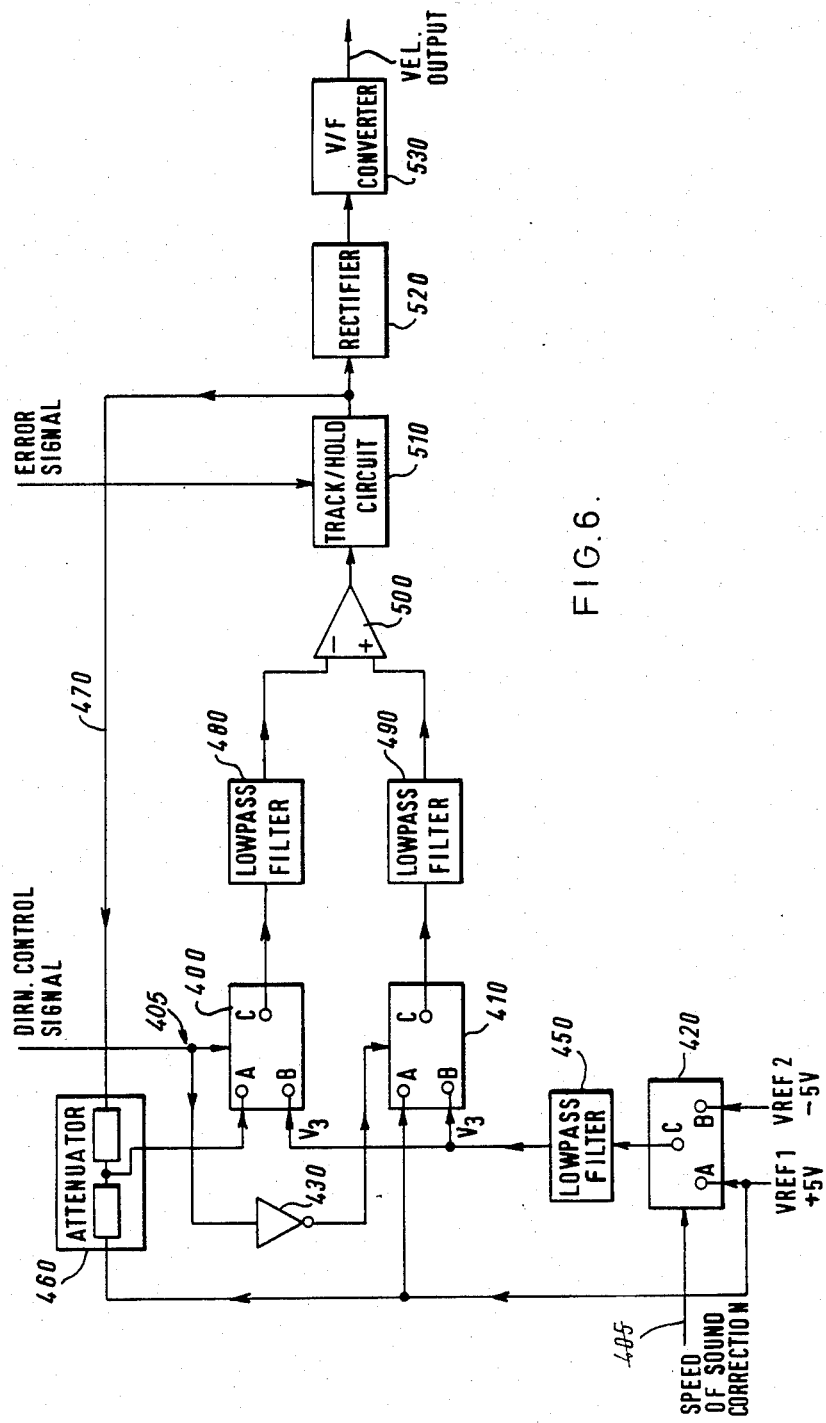
FIG. 6 shows an example of a signal processing circuit for use with the circuit of FIG. 2.

The output from the master flip-flop 100 also has a direct connection to the transmitter control circuit 130, to provide an enable signal and a further connection to a divider circuit 180, to provide a direction control to the circuit 130. The output from the divider circuit 180 also provides an output to a processing circuit (FIG. 6).

The transmitter control circuit 130, is connected to a pair of transmitters 190, 200 which are connected to respective transformers 80, 82 associated with the transducers $T_1$ and $T_2$. The transducers $T_1$, $T_2$ are arranged to act as both transmitters and receivers and are preferably piezo-electric devices. The transformers 80, 82 are arranged to receive signals in both directions so that when one transducer is transmitting, signals can be received by the other transducer and passed through its respective transformer to one of the terminals of a switch 210, which is controlled through the direction control lead from the divider circuit 180. The switch 210 may be replaced with a straight connection, but this can cause interference in aerated water conditions.

The receiver circuitry is made common for both transducers $T_1$, $T_2$, so that the processing delays in the receiver circuits do not fluctuate in dependence upon the direction of signal transmission. The receiver circuitry includes an amplifier 220, a filter 230, a variable threshold comparator 240, 250, and a divider 260. The gain of the amplifier 220 is adjustable through an AGC network including a gated detector 280, and an integrator 290.

The output signal from the comparator 240 is also fed to a monostable 270 which controls the reset of the divider circuit 260.

The divider circuit 260 has two outputs: a divide by 8 output which is connected both to the feedback network 250 and, through an AND gate 255, to the enable input of the detector 280; and a divide by 16 output which forms the input to the master flip-flop 100.

An error detection circuit 300 is provided, for detecting and compensating for errors ocurring in the transmitter and receiver circuits as will be described in more detail below. The error detection circuit 300 is connected to a 0.5 second monostable 310 which in turn outputs an error signal to the processing circuitry of FIG. 6.

Timing is controlled through the master timing circuit 150 which is clocked through a master oscillator 160, which has a frequency adjustment 170.

The master timing circuit 150 provides timing information to the flip-flop 100, monostable 270, AND gate 255 and error detection circuit 300. The timing circuit also provides a "speed of sound correction" output to the processing circuitry.

Operation of the transmission portion of the circuit will now be described with reference to FIG. 3, which shows a series of transmission cycles.

At the start of every transmission cycle, the master flip-flop 100 is enabled and the output thereof becomes high. This turns on the oscillator 110, which produces a square wave pulse train at 1 MHz which is applied to the divider circuit 120 which divides the pulse train by 2 to produce a 500 kilohertz output to the transmitter control circuit 130. The 500 kHz output from the divider circuit 120 is also fed into the divider circuit 140 which performs a divide by 8 (or optionally 12) operation. The output from the divider 140 acts to disable the master flip-flop 100 when 8 (or 12) pulses have been output from divider 120. The flip-flop output is therefore a pulse as shown in FIG. 3a' and the output from the divider 120, each time the master flip-flop 100 is enabled, is a pulse train of 8 (or 12) square wave pulses as illustrated in FIG. 3b'.

The divider circuit 180 counts pulses output from the master flip-flop 100 (FIG. 3a) and changes state every 8 pulses as shown in FIG. 3c. This signal is used to change the direction of transmission by the transmitter circuit. It is disadvantageous to change the direction of transmission after every pulse cycle, or after every two or three pulse cycles as the system tends to become destabilised and the signal transmitted by one transducer can be confused with the back scattered signal transmitted by the other transducer previously.

If the direction is alternated too slowly this can result in appreciable changes in the effective propogation velocity c between changes in direction of transmission.

The transmitter control circuit 130 is thus provided with a direction control input, an enable input and a pulse train input. The transmitter control 130 interprets these inputs to drive either transmitter 190 or transmitter 200, which in turn outputs a signal to its respective transformer 80, 82 (as shown in FIGS. 3d, 3e respectively) and thence to the transducers $T_1$, $T_2$.

Although two separate transmitters 190, 200 have been illustrated, these transmitters could easily be replaced by a single transmitter and a direction controlled logic gate, to switch the output from the transmitter between the transducers $T_1$, $T_2$ as appropriate.

The operation of the receiver portion of the circuit will now be described with reference to FIG. 4. The signal received by the receiving transducer, from the transmitting transducer selected by control circuit 130, is illustrated in FIG. 4b. Due to the characteristics of the transducers, the signal bears only slight relation to the signal output from the transmitter shown in FIG. 4a. As the rise time of the signal 4b is slow, accurate detection of a pulse early in the pulse train is not feasible. The receiver circuitry therefore takes a timing marker M from a pulse in the developed part of the pulse train.

The pulse train is fed, through switch 210, to the automatic gain control amplifier 220 whose function is to adjust the amplitude of the signal to a level suitable for subsequent processing. The output from the amplifier 220 is fed to a filtering stage 230 which is preferably a 500 kHz, 50 kHz band width, filter and thence to the comparator 240. The comparator has a variable threshold level, the threshold being varied through the feedback network 250. As can be seen from FIG. 4b, the comparator 240 has three threshold levels $c_0$, $c_1$ and $c_2$. The incoming signal is compared, firstly, to a intermediate positive level $c_1$ at a point above the base line of the signal. Each time a successful comparison is made, the divider circuit 260 increments by one, having been triggered through monostable 270 by the first pulse comparison. After the first comparison, the threshold level is changed by the feed back network to the zero crossing threshold $c_0$. When this has been detected, the comparator is switched back to threshold $c_1$ and so on until the eighth comparison has been made (the zero crossing on the fourth detected pulse) at which time the divider circuit 260 provides an output to the network 250 to change the positive comparison level to $c_2$. This change in level is made so that the circuit can reject intermediate level noise which may have been interpreted as an input signal previously. The comparisons then continue as before with the feedback network 250 adjusting the comparator threshold as previously described until the eighth zero crossing (M) (16th comparison). Due to the high gradient of the signal at this point in the pulse train, the time at which this transition occurs can be determined with great accuracy. At this point the divider 260 then sends a pulse to the master flip-flop 100, to indicate arrival of the transmitted pulse train, as shown in FIG. 4c. The flip-flop 100 then outputs a further pulse as shown in FIG. 4d.

When the divider circuit 260 outputs a pulse to master flip-flop 100, the flip-flop 100 outputs another pulse to the oscillator 110, transmit control circuit 130 and divider circuit 180. Thus, as shown more clearly in FIG. 3, a series of pulses are output from the master flip-flop. The arrival of the previous pulse at the input to the master flip-flop 100, via the receiver circuit, prompts the output of the next pulse to form a pulse train as shown in FIG. 3a. The divider circuit 180 counts these pulses and changes states every eighth pulse to produce a direction control signal as shown in FIG. 3c. The transmitter control circuit 130 then controls the tranmitters 190, 200 to alternately transmit a series of eight pulse trains, as shown in FIGS. 3d and 3e, each pulse train consisting of eight pulses at 500 kilohertz which have been input from the oscillator 110 and divider circuit 120.

The time taken for the direction control signal to change state ($t_\alpha$ or $t_\beta$) is equal to 8 transit times between the transducers $T_1$, $T_2$ (or vice versa) + 8 signal processing delays. As the receiver circuit is common to both transducers, the processing time will be substantially constant. Thus the difference in time taken for the direction control signal to change state ($t_\alpha$, $t_\beta$) will be proportional to the velocity of the ship by analogy with equation (4).

Figure 5:
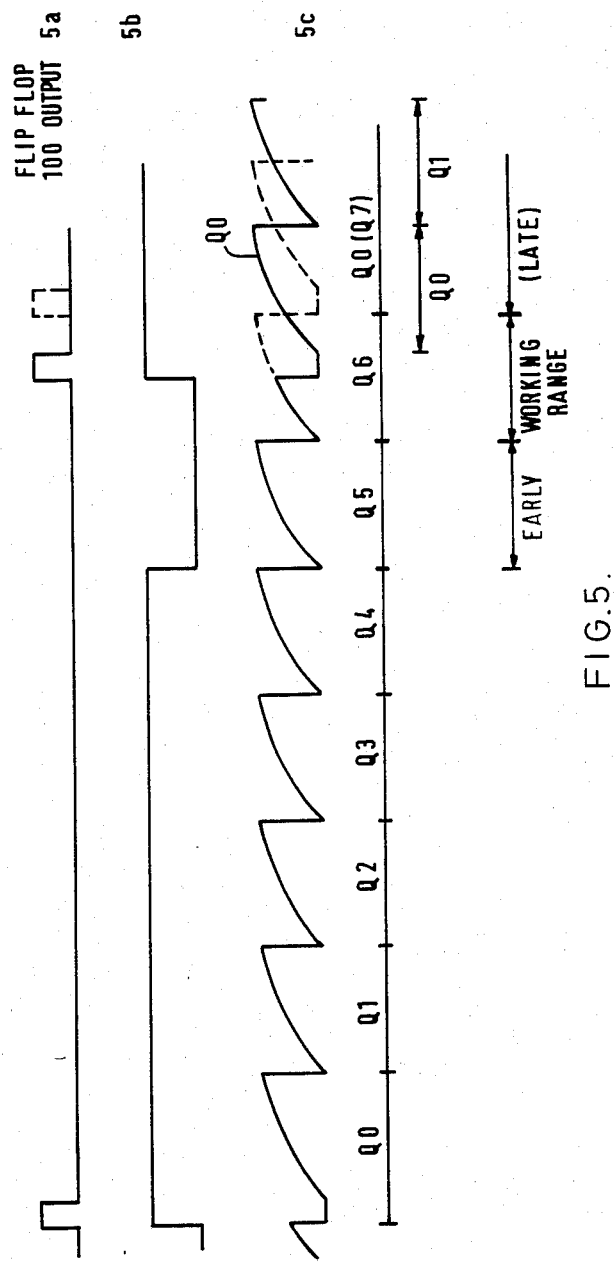

The error correction and detection circuitry will now be described with reference to FIGS. 2 and 5.

The timing for the error control circuitry is made through the master timing circuit 150. This circuit is connected to the master oscillator 160. The frequency of the master oscillator is adjusted in dependence upon the distance L between transducers $T_1$, $T_2$, so that when the ship is stationary, the time of reception, through the receiver circuitry of a pulse transmitted by the master flip-flop 100 (which will trigger the sending of another pulse from the flip-flop as shown in FIG. 5a) occurs during the cycle $Q_6$ of the oscillator as shown in FIG. 5c. The cycle $Q_6$ defines the working range of the receiver circuitry and variations on pulse train arrival time caused by ship speed variations will not generally be sufficient to place the arrival time outside cycle $Q_6$.

The master timing circuit 150 uses the timing information provided by the oscillator for controlling the various error detection and correction circuitry.

In order to ensure accurate timing, the master flip-flop resynchronises the oscillator every time it outputs a pulse.

In order to suppress any noise occuring before time interval $Q_5$, the divider circuit 260 which receives the comparator output 240, is held in a reset mode by a 2.7 $\mu s$ monostable 270. The monostable 270 is only enabled by the master timing circuit 150 at cycle $Q_5$ of the oscillator 160 as shown in FIG. 5b. The monostable 270 is then triggered by the incoming signal from the comparator 240, through line 241, to set the divider 260.

The monostable is arranged to keep the divider 260 enabled for two cycle periods $Q_5$, and $Q_6$. However, signals received are only used for processing if they occur within the working range cycle $Q_6$. Pulses arriving in cycle time $Q_5$ are taken to be too early and are therefore judged to be an error. Triggering in the period $Q_5$ will most often be caused by the amplitude of the signal being too high so that noise is amplified and interpreted as the received signal. Similarly, if the pulse is not received by the end of cycle $Q_6$, this also indicates an error which is probably caused by the amplitude of the received signal being too low. The error detection circuit 300 is used to compensate for this and receives inputs from the master timing circuit at cycle $Q_5$ and cycle $Q_7$. An output from the master flip-flop 100 is also input. If the pulse from the master flip-flop is found to occur at the cycle $Q_5$ or cycle $Q_7$ intervals, an output from the error detection circuit is fed to enable the integrator 290 which acts, in combination with the detector 280 and amplifier 220, to adjust the amplitude of the received pulse train. The detector 280 is only enabled at the potential valid time of arrival of a pulse through the receiver circuit, the enable signal being sent through AND gate 255 which gates the pulse $Q_6$ from the master timing circuit 150 with the divide by eight output from the divider 260. The gated detector then detects the amplitude of the incoming signal, which is then used to adjust the gain of the amplifier 220 through integrator 290. The gain of the amplifier is thus adjusted for the next received pulse train, using the previous pulse train as a reference.

When a error is detected, the detection circuit triggers a 0.5 second monostable which ensures that the error signal remains high until the system settles down following the error.

When the signal is not received by the start of the cycle Q7, the master timing circuit outputs a pulse to the master flip-flop 100 to trigger pulse output (the same pulse is also sent to the error detection circuit 300 which effects a gain correction as described above).

The processing circuitry will now be described with reference to FIG. 6 which illustrates an analogue averaging technique for obtaining a velocity signal proportional to frequency. The circuit includes two switches 400, 410 which each have two signal inputs A, B and a single output C. Switch 400 is controlled by the direction control signal which is also fed, through NOT element 430, to the control input of switch 410 so that the switches 400, 410 are controlled in anti-phase.

The inputs B of switches 400, 410 are connected via a low pass filter 450 to a switch 420, which has two level inputs $v_{ref1}$ and $v_{ref2}$ and a control input. The control input is obtained from the master timing circuit and is a speed of sound correction signal, the use of which is explained below. The level $v_{ref1}$ is fed to input A of switch 410 and also, through an attenuator 460, to input A of switch 400. The attenuator 460 modulates the input $v_{ref1}$ with the output voltage from the circuit via feedback loop 470.

The outputs from the switches 400, 410 are each fed to low pass filters 480, 490 and thence to an operational amplifier 500. The output from the operational amplifier is connected to a track and hold circuit 510 to which the error signal from the monostable 310 is input.

The output from the circuit 510 is fed to a rectifier 520 which is connected to a voltage to frequency converter which gives a frequency output proportional to speed.

In use, the combination of each switch 400, 410 and 420 and respective low pass filter 480, 490, 450 forms an averaging circuit which averages the inputs A, B to the switches in dependence upon the length of time to which they are connected to their respective outputs C under control of the respective control inputs.

The switches are controlled so that switch 400 will be in position A when the control input is high, while switch 410 will in position B, and vice versa. Averaged outputs from the respective switches will therefore be dependent upon the difference in time duration of the direction control signal portions $t_\alpha$, $t_\beta$ as shown in FIG. 3c.

The averaged outputs are applied to the operational amplifier 500 to produce a signal which, when applied to input A of switch 400 via attenuator 460, modulates the value of $v_{ref1}$ so as to cause the operational amplifier inputs to be equal. This feed back signal is then proportional to ship's speed.

More specifically, At swich 410:

$$\text{Average output} = \frac{t_\alpha \cdot v_{ref1} + t_\beta \cdot v_3}{t_\alpha + t_\beta}$$

At switch 400:

$$\text{Average output} = \frac{t_\alpha \cdot v_3 + t_\beta (v_{ref1} - kx)}{t_\alpha + t_\beta}$$

where
  x = output signal from op amp
  k = attenuation of attenuator 460.

The Op Amp 500 adjusts x to make the inputs thereto equal to that:

$$\frac{(t_\alpha \cdot v_{ref1} + t_\beta \cdot v_3) - (t_\alpha \cdot v_3 + t_\beta (v_{ref1} - kx))}{t_\alpha + t_\beta} = 0 \quad (5)$$

$$\text{so } (v_{ref1}2 - v_3) \cdot \frac{(t_\beta - t_\alpha)}{t_\alpha - t_\beta} = \frac{t_\beta}{t_\alpha = t_\beta} kx$$

$$\text{As } t_3060 \simeq t_\beta, \frac{t_\beta}{t_\alpha + t_\beta} = 0.5$$

$$\text{so } kx = 2(v_{ref1} - v_3)\frac{(t_\beta - t_\alpha)}{(t_\beta + t_\alpha)}$$

using eqns. 1 and 2:

$$t_\alpha = (8L/c + v') + 8tp$$

$$t_\beta = (8L/c - v') + 8tp$$

where tp = processing delay.

So:

$$\frac{t_\beta - t_\alpha}{t_\beta + t_\alpha} = \frac{\frac{Lv'}{c^2}}{tp + \frac{L}{c}} \quad (c >> v') \quad (6)$$

substituting (6) in (5):

$$x = \frac{2}{k}(v_{ref1} - v_3)\frac{Lv'}{c^2 tp + Lc} \quad (7)$$

The output signal x is thus proportional to speed v'. However, x also varies with c, so a speed of sound correction signal is introduced. The signal is a square wave which causes switch 420 to spend time $t_3$ (fixed and arbitrary ($t_3 < t_\alpha + t_\beta$)) switched to $v_{ref2}$ and time ($t_\alpha + t_\beta - t_3$) switched to $v_{ref1}$.

Therefore the averaged output of switch 420 ($v_3$) is in fact:

$$V_3 = \frac{v_{ref2} \cdot t_3 + v_{ref1}(t_\alpha + t_\beta - t_3)}{t_\alpha + t_\beta}$$

$$= \frac{t_3}{t_\alpha + t_\beta}(v_{ref2} - v_{ref1}) + v_{ref1}$$

Now $t_\alpha + t_\beta = 16\left(tp + \frac{L}{c}\right)$ $$\text{so } v_3 = \frac{t_3}{16\left(tp + \frac{L}{c}\right)} \cdot (v_{ref2} - v_{ref1}) + v_{ref1} \quad (8)$$

thus, combining (7) and (8):

$$x = \frac{2}{k}(v_{ref1} - v_{ref2})\frac{\frac{Lv'}{c^2}}{\left(tp + \frac{L}{c}\right)}\frac{t_3}{16\left(tp + \frac{L}{c}\right)} \quad (9)$$

$$= \frac{1}{8k}(v_{ref1} - v_{ref2})t_3v' \cdot \frac{L/c^2}{tp^2 + 2tp\frac{L}{c} + \left(\frac{L}{c}\right)^2}$$

Now $tp \sim 2 \times 10^{-5} S$
$L \sim 1$ m
$c \sim 1500$ ms$^{-1}$

Hence: $\left(\frac{L}{c}\right)^2 >> 2\,tp\frac{L}{c} + tp^2$ (10)

so: $x = (v_{ref1} - v_{ref2})\frac{t_3v'}{8kL}$ which is independent of c.

Figure 2:
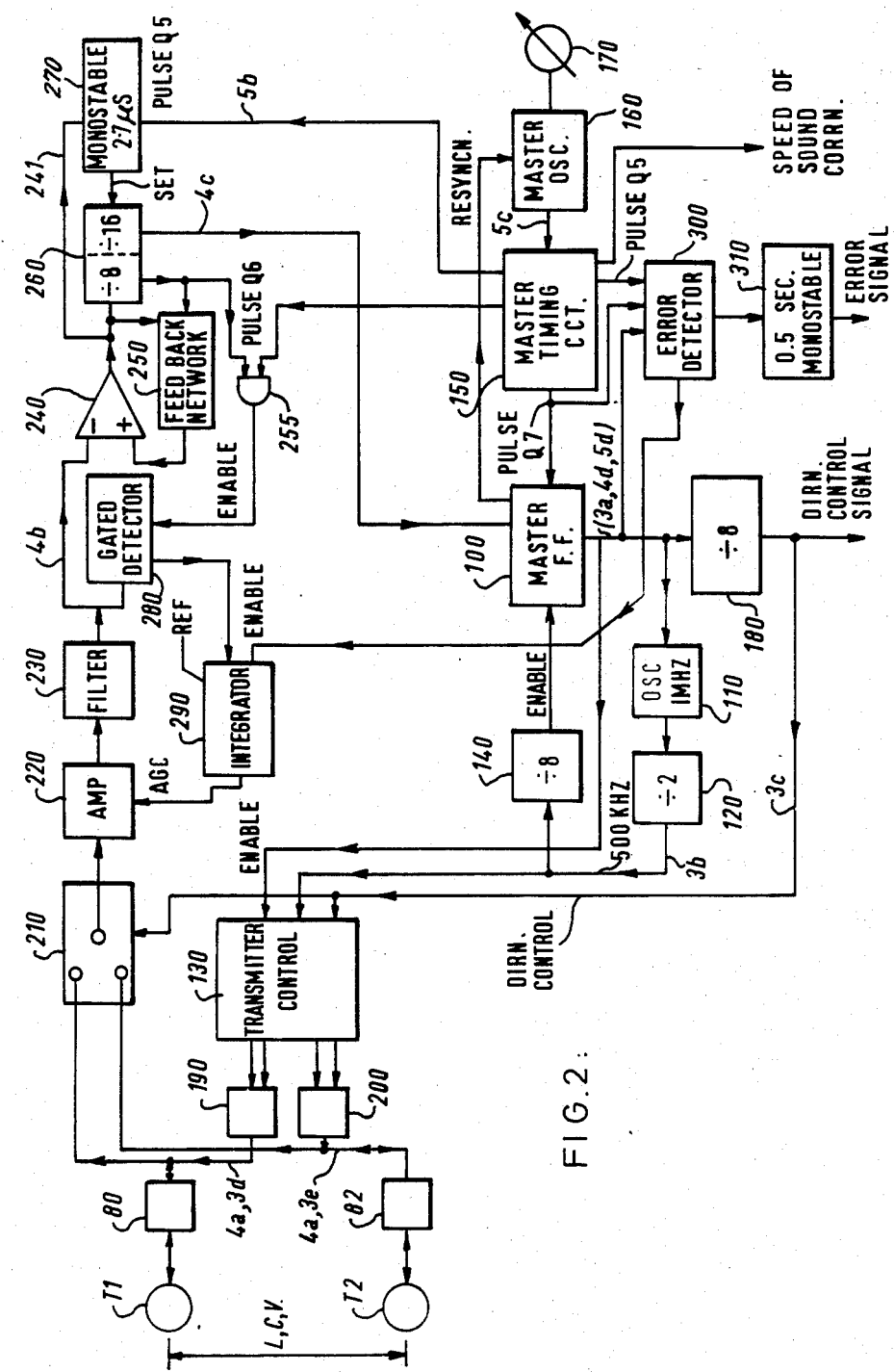
FIG. 2 is a block diagram showing the transmitter and receiver circuitry of the embodiment of FIG. 1.

As shown in FIGS. 2 and 6, $t_3$ is derived from the master timing circuit, and is chosen so as to be proportional to L (the frequency of the master oscillator is adjusted in dependence upon L) thus making the overall scaling factor independent of L also.

In the event of an error being detected, the previous voltage indicating speed is held in the track/hold circuit 510 by application of the error signal. The 0.5 second monostable 310 ensures that the error signal remains present for a sufficient time to allow the system to settle down after the error.

The rectifier is included so that when the ship 10 is moved in the opposite direction to its normal direction of travel the speed indications do not appear as negative.

The voltage to frequency convertor 530 converts the speed indicative voltage to a speed indicative frequency, this frequency signal being fed to a display device.

The processing circuitry also preferably includes a delay circuit at junction 405, for delaying the input to switch 410 by two out of the eight pulse cycles, the timing for this coming from the master flip-flop 100. This results in the first two pulse cycles of each velocity signal $t_\alpha$, $t_\beta$ being ignored, introducing a further scaling factor into the output. However, this allows any mistriggering caused by confusion between the signal transmitted by one transducer with the back scattered signal transmitted by the other transducer previously to be suppressed.

It is to be understood that the processing circuit and technique illustrated are not to be construed as limitative and a standard digital processing technique would be equally applicable using, for example, a 500 MHz clock with a 20 bit ECL logic up/down counter, although such a technique has the disadvantages of having a higher power consumption, higher noise generation and being generally more expensive than the analogue system described.

While the embodiment of the invention described has been applied to a ship, this is not to be construed as limitative. For example, the device is applicable to the measurement of speed of any object to which it is applied provided the object moves through a medium which allows acoustic transmissions therethrough.

Also, while a frequency, f, of acoustic transmission of 500 kHz has been used, other frequencies in the range 200 KHz $<f<$ 1.5 MHz are usable.

Furthermore magneto-strictive transducers are equally feasible for use as the transducers $T_1$, $T_2$.

I claim:

1. A speed measuring device for measuring the speed of a marine vessel comprising:
   first transducer means,
   second transducer means,
   the first and second transducer means being mountable on the marine vessel below the water line thereof so as to face one another across an acoustic path in substantially the direction of motion of the vessel,
   transmitter means connected to said first and second transducer means for selecting one of the first and second transducer means and for energizing the selected transducer means for transmission of an acoustic signal along the acoustic path and further including means for changing the selection of the transducer means so as to change the direction of said transmission,
   receiver means connected to said first and second transducer means for processing the acoustic signal as received at the non-selected transducer means and for determining the arrival time of said acoustic signal,
   control means for controlling the transmitter means and receiver means; and
   processing means connected and responsive to the transmitter means and the receiver means for processing the transit time of acoustic signals in both directions between the first and second transducer means for deriving a signal indicative of the speed of the vessel,
   and wherein the receiver means includes a comparator having a variable comparison level for identifying three different levels of a transmitted acoustic signal, the control means controlling said comparator so that the comparison level changes between said levels in a predetermined order, and means for sensing a predetermined number of successful comparisons by said comparator which includes at least one comparison at each of said three levels, the receiver means outputting an identification signal when said predetermined number of comparisons has been sensed.

2. A speed measuring device as claimed in claim 1, wherein said three predetermined levels comprise zero and first and second different levels of like polarity.

3. A device as claimed in claim 1, wherein the sensing means comprises a divider connected to the comparator means.

4. A device as claimed in claim 1, wherein the changing means changes said selection after 8 acoustic signal transmissions.

5. A device as claimed in claim 1, wherein the frequency of said acoustic signal is greater than 200 kHz.

6. A device as claimed in claim 1, wherein the receiver means includes an automatic gain control, the automatic gain control adjusting the gain of the received signal in response to the gain of the received acoustic signal.

7. A device as claimed in claim 1, wherein the receiver means comprises a single receiver circuit connected to said first and second transducer means.

8. A device as claimed in claim 1, wherein the first and second transducer means each comprise a single piezo-electric element.

9. A device as claimed in claim 1, wherein the transmitter means includes first and second transmitters associated with the first and second transducer means.

10. A device as claimed in claim 1, wherein the transmitter means includes a transmitter, and a gate connected to the transmitter and responsive to the changing means, the gate being connected to said first and second transducer means.

11. A speed measuring device for measuring the speed of a marine vessel comprising:

first transducer means, second transducer means, the first and second transducer means being mountable on the marine vessel below the water line thereof so as to face one another across an acoustic path in substantially the direction of motion of the vessel, transmitter means connected to said first and second transducer means for selecting one of the first and second transducer means and for energizing the selected transducer means for transmission of an acoustic signal along the acoustic path and further including means for changing the selection of the transducer means so as to change the direction of said transmission, receiver means connected to said first and second transducer means for processing the acoustic signal as received at the non-selected transducer means and for determining the arrival time of said acoustic signal, control means for controlling the transmitter means and receiver means; and processing means connected and responsive to the transmitter means and the receiver means for processing the transit time of acoustic signals in both directions between the first and second transducer means for deriving a signal indicative of the speed of the vessel, wherein the receiver means includes a comparison circuit having a variable comparison level for identifying three different levels of a transmitted acoustic signal and means for sensing a predetermined number of successful comparisons by said comparison circuit which predetermined number of comparisons includes at least one comparison at each of said three levels, the comparisons being made in a predetermined order and the receiver means indicating when said predetermined number of comparisons has been sensed.

* * * * *